United States Patent
Silveira et al.

(10) Patent No.: US 8,107,460 B1
(45) Date of Patent: Jan. 31, 2012

(54) SYSTEM AND METHOD FOR IP TELEPHONY PAGING

(75) Inventors: Alaric Silveira, Austin, TX (US); Dallas Clement, Pflugerville, TX (US)

(73) Assignee: Voxpath Networks, Inc., Austin, TX (US)

( * ) Notice: Subject to any disclaimer, the term of this patent is extended or adjusted under 35 U.S.C. 154(b) by 999 days.

(21) Appl. No.: 11/503,584

(22) Filed: Aug. 14, 2006

(51) Int. Cl.
*H04L 12/66* (2006.01)

(52) U.S. Cl. .................... 370/352; 370/401; 370/522

(58) Field of Classification Search .............. 370/252, 370/254, 400, 401, 464, 465, 466, 467, 352–354, 370/522

See application file for complete search history.

(56) References Cited

U.S. PATENT DOCUMENTS

| | | | |
|---|---|---|---|
| 5,790,548 A | 8/1998 | Sistanizadeh et al. | |
| 6,061,349 A | 5/2000 | Coile et al. | |
| 6,073,178 A | 6/2000 | Wong et al. | |
| 6,097,719 A | 8/2000 | Benash et al. | |
| 6,178,455 B1 | 1/2001 | Schutte et al. | |
| 6,353,660 B1 | 3/2002 | Burger et al. | |
| 6,381,638 B1 | 4/2002 | Mahler et al. | |
| 6,496,867 B1 | 12/2002 | Beser et al. | |
| 6,515,997 B1 | 2/2003 | Feltner et al. | |
| 6,529,499 B1 | 3/2003 | Dosh et al. | |
| 6,577,642 B1 | 6/2003 | Fijolek et al. | |
| 6,657,991 B1 | 12/2003 | Akgun et al. | |
| 6,683,871 B1 * | 1/2004 | Lee et al. ...................... | 370/356 |
| 6,687,245 B2 | 2/2004 | Fangman et al. | |
| 6,697,862 B1 | 2/2004 | Beser et al. | |
| 6,738,362 B1 | 5/2004 | Xu et al. | |
| 6,765,881 B1 | 7/2004 | Rajakarunanayake | |
| 6,772,210 B1 | 8/2004 | Edholm et al. | |
| 6,775,273 B1 | 8/2004 | Kung et al. | |
| 6,798,751 B1 | 9/2004 | Voit et al. | |
| 6,798,755 B2 * | 9/2004 | Lillie et al. .................... | 370/312 |
| 6,822,957 B1 | 11/2004 | Schuster et al. | |
| 6,829,250 B2 | 12/2004 | Voit et al. | |
| 6,877,042 B2 | 4/2005 | Tawil et al. | |
| 6,882,850 B2 * | 4/2005 | McConnell et al. .......... | 455/453 |
| 6,958,992 B2 | 10/2005 | Lee et al. | |
| 6,980,526 B2 | 12/2005 | Jang et al. | |
| 7,002,973 B2 | 2/2006 | MeLampy et al. | |

(Continued)

OTHER PUBLICATIONS

A Radvision Technology White Paper "Traversal of IP Voice and Video Data through Firewalls and NATs", 2001, 18 pages.

(Continued)

*Primary Examiner* — Robert Scheibel
*Assistant Examiner* — Mark A Mais
(74) *Attorney, Agent, or Firm* — Rory D. Rankin; Meyertons, Hood, Kivlin, Kowert & Goetzel, P.C.

(57) ABSTRACT

An IP-telephony system including one or more nodes coupled to a session controller. Each node includes a service gateway coupled to one or more terminals. A first terminal conveys a start page request initiating a page activity between itself and one or more terminating terminals. The session controller receives the start page request and in response, conveys first control signals to one or more service gateways, each first control signal containing information identifying which of the terminals associated with a service gateway is a terminating terminal. In response to the first control signal, each service gateway conveys second control signals to its associated terminating terminals. The first terminal conveys a media packet to the first service gateway during a page activity. The first service gateway forwards the media packet to one or more designated terminating terminals.

25 Claims, 9 Drawing Sheets

U.S. PATENT DOCUMENTS

| | | | |
|---|---|---|---|
| 7,023,813 B2* | 4/2006 | Newberg et al. | 370/312 |
| 7,068,646 B2 | 6/2006 | Fangman et al. | |
| 7,068,647 B2 | 6/2006 | Fangman et al. | |
| 7,724,743 B2* | 5/2010 | Razdan et al. | 370/392 |
| 7,751,348 B2* | 7/2010 | Shaffer et al. | 370/260 |
| 2001/0043571 A1 | 11/2001 | Jang et al. | |
| 2002/0044567 A1 | 4/2002 | Voit et al. | |
| 2002/0052915 A1 | 5/2002 | Amin-Salehi | |
| 2002/0093915 A1 | 7/2002 | Larson | |
| 2002/0110114 A1* | 8/2002 | Taylor et al. | 370/352 |
| 2004/0177069 A1* | 9/2004 | Li et al. | 707/5 |
| 2007/0010272 A1* | 1/2007 | Calviac et al. | 455/518 |

OTHER PUBLICATIONS

Dynamicsoft SIP Firewall Control Proxy, 2001, 4 pages.

Dynamicsoft SIP Edge Proxy, 2001, 2 pages.

* cited by examiner

SYSTEM AND METHOD FOR IP TELEPHONY PAGING

BACKGROUND OF THE INVENTION

1. Field of the Invention

The present invention relates to the field of telephony, and more particularly to Internet Protocol (IP) based telephony.

2. Description of the Related Art

IP-based telephony refers to the technology to make telephone calls and send faxes over IP-based data networks with a suitable quality of service (QoS) and superior cost/benefit ratio. Some of the motivating factors for development of IP-based telephony are lower cost, consolidation of network infrastructure, and ability to support advanced applications. Lower costs may be achieved primarily by substantially reducing long distance telephone charges. Consolidation of network infrastructure may include an integrated voice/data network that allows more standardization and reduces total equipment needs. In addition, the number of failure points may be reduced, accounting systems may be consolidated, and operations may be combined, thereby increasing the overall operating efficiency. Advanced applications such as multimedia and multi-service applications may be more readily supported by IP-based telephony systems. These benefits are expected to drive substantial growth in the IP-based telephony market over the near future.

Demand for IP-based telephony, particularly in the business market, has included a demand for hosted solutions. In hosted IP-telephony, a solution provider may operate one or more servers connected to the Internet that host a telephony application to which a client connects a number of terminals equipped to exchange IP packets. Common client terminals include an IP-telephone or a computer configured to operate as an IP-telephony client. Hosted IP-telephony solutions may be expected to provide an alternative to premise-based solutions such as a private branch exchange (PBX), IP-based private branch exchange (IPBX), key systems, etc. In order to compete with such premise based solutions, it may be desirable to provide a number of features and functions commonly seen in premise based solutions. One such feature/function is desktop voice paging which utilizes the desktop business telephone set and its built-in speaker-phone as a paging terminal. Unfortunately, support for voice paging is not readily available in terminal-to-terminal IP-based telephony systems.

Accordingly, systems and methods for providing paging functionality within the context of IP-telephony systems is desired.

SUMMARY OF THE INVENTION

Various embodiments of a hosted IP-telephony system are disclosed. In one embodiment, a hosted IP-telephony system includes one or more nodes coupled to a session controller. Each node includes a service gateway coupled to one or more terminals. A first terminal is configured to initiate a page between the first terminal and one or more terminating terminals by conveying a start page request. The session controller is configured to receive the start page request and in response, convey one or more first control signals to one or more respective service gateways, each of said first control signals containing information identifying which of the one or more terminals associated with a respective service gateway is a terminating terminal. In response to the first control signal, each service gateway is configured to convey one or more second control signals to its associated terminating terminals.

In one embodiment, the start page request is received by a service gateway associated with the first terminal. The service gateway is configured to forward the start page request to the session controller.

In a further embodiment, the first terminal is configured to convey a media packet to the first service gateway during a page activity. The first service gateway is configured to forward the media packet to one or more designated terminating terminals. Information contained in at least one of the first control signals identifies the designated terminating terminals.

In a still further embodiment, the first terminal is configured to convey a media packet to the first service gateway during a page activity. In response to determining one or more terminating terminals are associated with a remote node, the first service gateway is configured to propagate the media packet to one or more other service gateways associated with the remote terminals. In response to determining one or more terminating terminals are included in the local node, the service gateway is configured to reflect the mediate packet back to the terminating terminals of the local node. Information contained in at least one of the first control signals identifies the second service gateway. The second service gateway is configured to forward the media packet to one or more designated terminating terminals. Information contained in at least one of the first control signals identifies the designated terminating terminals.

DETAILED DESCRIPTION

Figure 1:
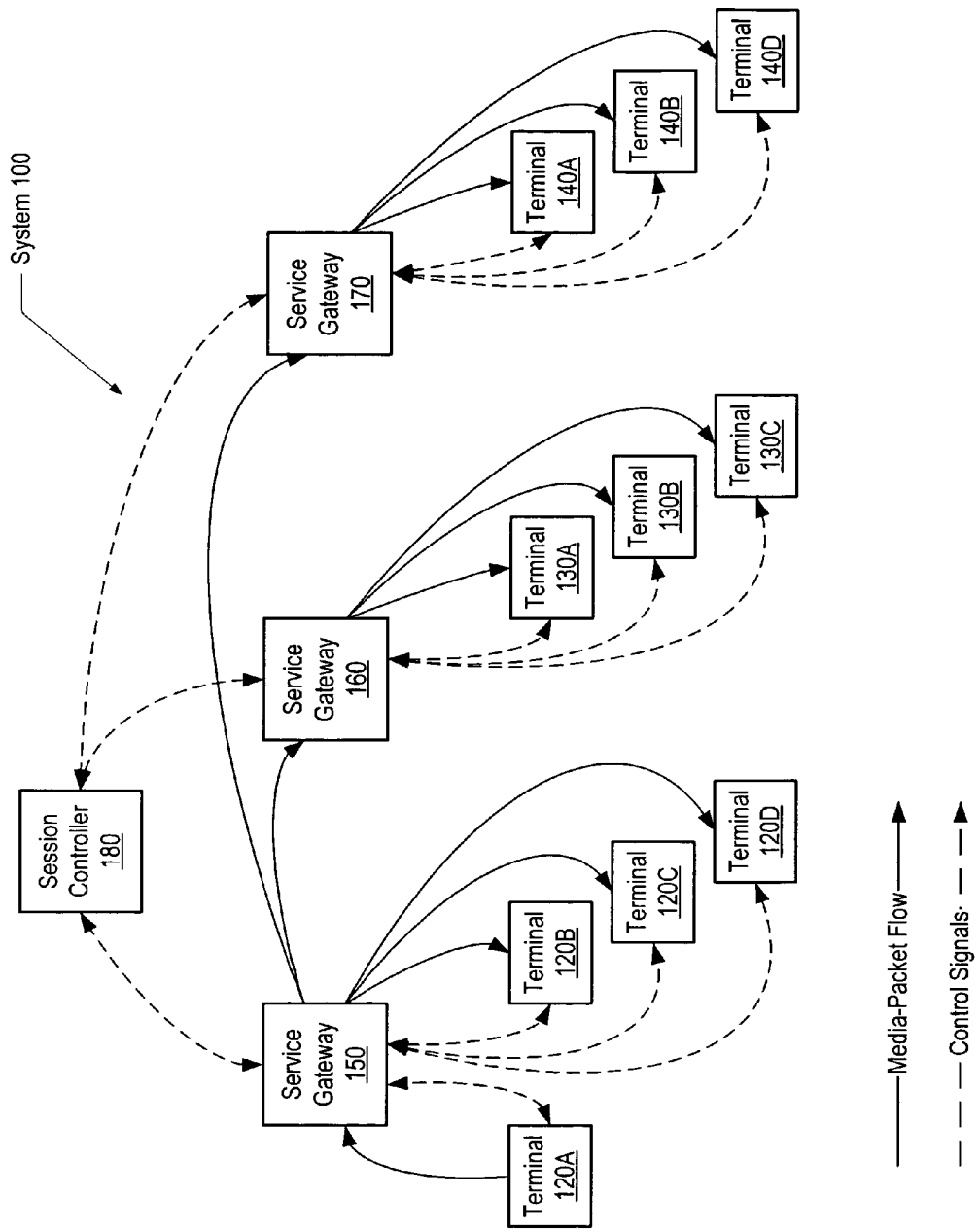
FIG. 1 is a generalized block diagram of one embodiment of a hosted IP-telephony system.

FIG. 1 is a generalized block diagram of one embodiment of a hosted IP-telephony system 100. System 100 includes terminals 120A-120D, 130A-130C, and 140A-140C. In on embodiment, terminals 120, 130, and 140 comprise telephones. Terminals 120A-120D are coupled to a service gateway 150, terminals 130A-130C are coupled to a service gateway 160, and terminals 140A-140C are coupled to a service gateway 170. Service gateways 150, 160, and 170 are further coupled to a session controller 180. In one embodiment, each service gateway and the terminals coupled to it may be referred to as a node. Each node may be a physical or a logical node. For example, each node may represent a separate department in a single facility, separate floor of a building, or separate locations entirely, etc. Although in the illustrated embodiment, three service gateways are shown coupled to session controller 180, in other embodiments, more or fewer than three service gateways may be coupled to session controller 180. In addition, in various embodiments, any number of terminals may be associated with each service gateway. Generally speaking, a service gateway, such as gateways 150, 160, and 170, comprise any system or device that operates to mediate communications between terminals or other gateways, as well as between terminals and external devices (e.g. IP devices), such as telephones on other networks, Trunking Gateways, or telephones or devices on the PSTN (Public Switched Telephone Network), ISDN (Integrated Services Digital Network), or FDDI (Fiber Distributed Data Interface), among others. Elements referred to herein with a particular reference number followed by a letter may be collectively referred to by the reference number alone. For example, terminals 120A-120D may be collectively referred to as terminals 120.

Control signals, illustrated as dashed lines in FIG. 1, for initiating and terminating IP-telephony activities may be transmitted and received between each terminal and its associated service gateway as well as between each service gateway and session controller 180. Additional details of the exchange of control signals are provided below. During IP-telephony activities, media packets (e.g., containing voice data) may flow from an initiating terminal to its associated service gateway (i.e., the service gateway which is part of the local node) and to one or more terminating terminals and/or to additional service gateways and terminals. For example, terminal 120A is shown transmitting media packets to service gateway 150. Service gateway 150 forwards the received media packets to terminals 120B-120D and to service gateways 160 and 170. Service gateway 160 forwards the received media packets to terminals 130A-130C. Service gateway 170 forwards the received media packets to terminals 140A-140C. Additional details of the exchange of media packets are provided below.

In the illustrated embodiment, terminal 120A is shown as the transmitting terminal. Of course, during other IP-telephony activities, any of terminals 120A-120D, 130A-130C, and 140A-140C may be transmitting terminals. In addition, any number of terminals 120A-120D, 130A-130C, and 140A-140C may be terminating terminals, including a single terminal, all terminals, or a subset of all terminals, depending on the desired IP-telephony activity.

Figure 2:
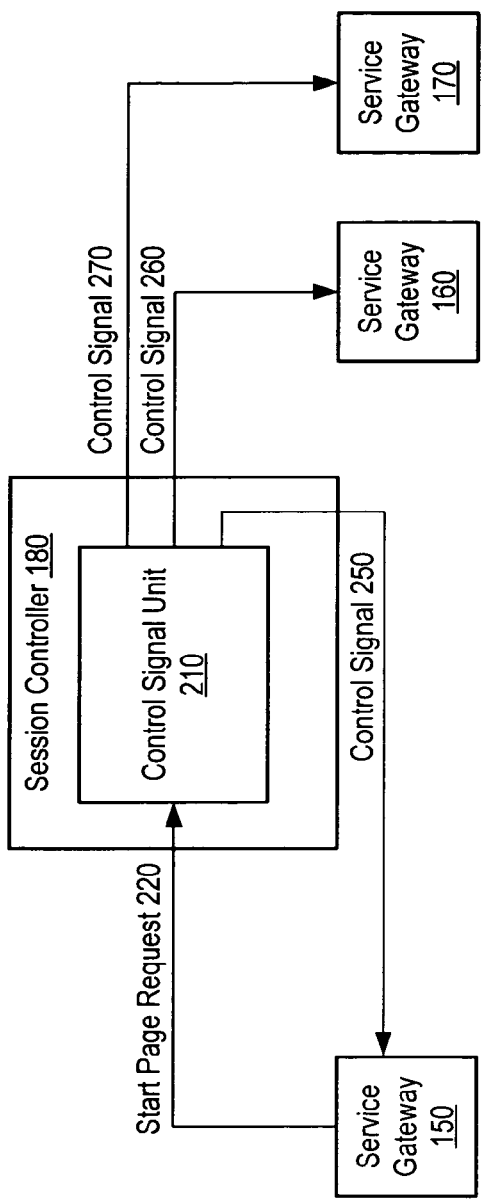
FIG. 2 illustrates one embodiment of the control signal connections between a session controller and service gateways.

FIG. 2 illustrates one embodiment of the control signal connections between a session controller 180 and service gateways 150, 160, and 170. Session controller 180 includes a control signal unit 210. In the scenario illustrated in FIG. 2, service gateway 150 is associated with a terminal that originates an IP-telephony page activity and each of service gateways 150, 160, and 170 is associated with one or more terminals that participate in the page activity as either a transmitter or a receiver of media packets. Service gateway 150 may be referred to as a primary service gateway and service gateways 160 and 170 may be referred to as secondary service gateways. During operation, a start page request 220 received by service gateway 150 from an initiating terminal may be forwarded to session controller 180 in order to start a page activity. In one embodiment, start page request 220 may include information indicating the desired terminals to be included in the page, such as by including a list of telephone numbers. In alternative embodiments, various other types of information indicating the desired terminals to be included in the page may be included in start page request 220 such as the identification of one or more groups whose members are terminating terminals. Control signal unit 210 may receive start page request 220 and in response transmit control signals 250, 260, and 270 to service gateways 150, 160, and 170; respectively. Control signal 250 may contain information indicating which terminals coupled to primary service gateway 150 are requested to participate in the page activity. In addition, the control signal(s) 250 may identify other gateways (e.g., gateways 160 and/or 170) which are associated with terminals targeted for participation in the paging activity. Control signal 260 may contain information indicating which terminals coupled to service gateway 160 are requested to participate in the page activity. Similarly, control signal 270 may contain information indicating which terminals coupled to service gateway 170 are requested to participate in the page activity. As used herein, a "page" or "paging" may comprise conveying any combination of audio, video, and/or other data. Further, such a conveyance may be directed to, or conveyed to, any of one or more devices.

As described above, control signal unit 210 may provide control signals to each service gateway involved in a page activity. In one embodiment, session controller 180 maintains, or otherwise has access to, information identifying associations between terminals and service gateways. Such information may be maintained in a centrally located database, remotely located database, or any other suitable manner. In this manner, the session controller 180 may identify which service gateways (150, 160, and/or 170) are to participate in initiated page activity. For example, such a database may include an identification of each of the terminating terminals in a system, as well as the service gateways to which they are coupled. In addition to having unique abstract identifiers for each of the terminals, terminals may also be associated with particular individuals. Further, terminals and/or individuals may be associated with one or more groups. For example, selected terminals which are part of different nodes may be identified as being part of a "Sales" group. The Sales group may then have an identifier which can be used to refer to all terminals associated with the group. Should an individual wish to initiate a page to a particular group, the start request may simply include an identification of the group. Responsive to receiving the page request, the session controller 180 may then determine which terminals and/or gateways are associated with the group. In the following discussion, details of how a service gateway handles information received from session controller 180 are given.

Figure 3:
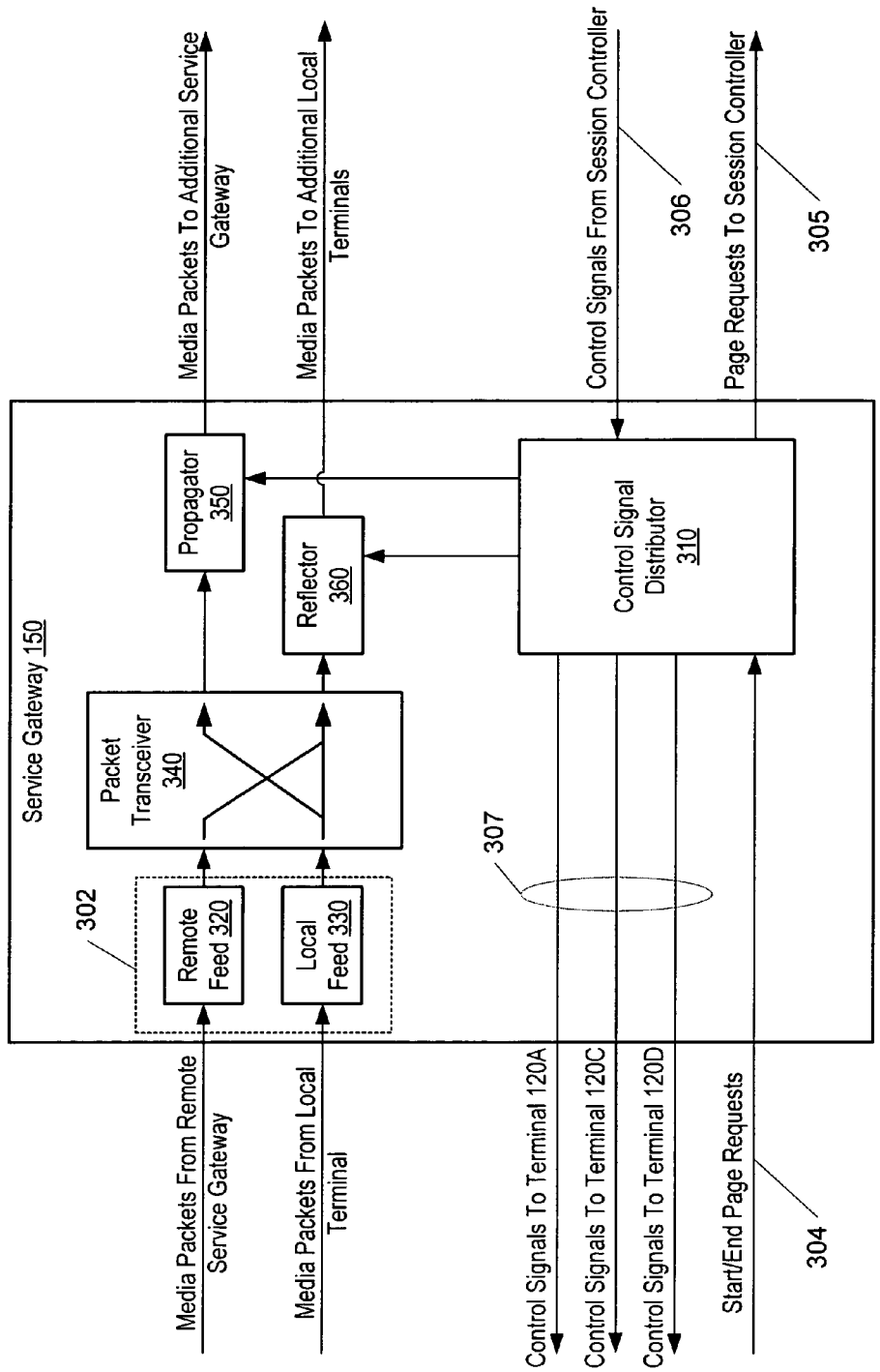
FIG. 3 is a block diagram of one embodiment of a service gateway.

FIG. 3 is a block diagram of one embodiment of a service gateway 150 that includes a control signal distributor 310, a packet receiving unit 302 which includes remote feed logic 320 and local feed logic 330, a packet transceiver 340, a propagator 350, and a reflector 360. Control signal distributor 310 may be coupled to propagator 350, and reflector 360. Remote feed 320 and local feed 330 may each separately convey media packets to packet transceiver 340. Alternatively, packet receiving unit 302 may convey both remote and locally fed data to packet transceiver 340 as a non-differentiated stream. Propagator 350 and reflector 360 may each transmit packets received from packet transceiver 340.

In one embodiment, configuration of a page activity may proceed as follows. Control signal distributor 310 may receive a start page request 304 from a terminal attempting to initiate a page activity. A corresponding start page request 305 may then be forwarded to session controller 180. Control signals 306 returned from session controller 180 may be used to configure service gateway 150. For example, in response to the control signal(s) 306 (and possibly the request 304) control signals may be sent to propagator 350 and/or reflector 360, depending on the number and location of terminals involved in the desired page activity. Control signal distributor 310 may further distribute control signals 307 to terminals that are coupled locally to service gateway 150. For example, in the illustrated embodiment, control signal distributor 310 distributes signals to terminals 120A, 120C, and 120D. Propagator 350 may receive control signals indicating which additional gateways are to receive media packets targeted to terminals that are not coupled to service gateway 150. Reflector 360 may receive control signals indicating which terminals that are coupled to service gateway 150 are to receive media packets during a page activity.

Once the service gateway 150 has been configured for a page activity, media packets may be processed and directed appropriately. For example, remote feed 320 may receive media packets from a remote service gateway if the initiating terminal is not coupled to service gateway 150, that is, if service gateway 150 is a secondary service gateway. Media packets received from remote feed 320 may be sent by packet transceiver 340 to reflector 360. Reflector 360 may forward received media packets to the local terminals that have been indicated during configuration to be participating in a page activity. Alternatively, if service gateway 150 is a primary service gateway, local feed 330 may receive media packets from an initiating terminal. Media packets received from local feed 330 may be sent by packet transceiver 340 to both propagator 350 and reflector 360. Propagator 350 may forward received media packets to additional service gateways to which terminals are connected that have been indicated during configuration to be participating in a page activity. Reflector 360 may forward received media packets to the local terminals that have been indicated during configuration to be participating in a page activity.

In an alternative embodiment, control signals may be sent to packet transceiver 340 rather than to propagator 350 and reflector 360. In that case, packet transceiver 340 may be configured to forward media packets received from local feed 330 to propagator 350 only if control signals indicate there are additional service gateways to which terminals are connected that are participating in a page activity. Also, packet transceiver 340 may be configured to forward media packets received from local feed 330 to reflector 360 only if control signals indicate there are terminals connected to service gateway 150 that are participating in a page activity.

Figure 4:
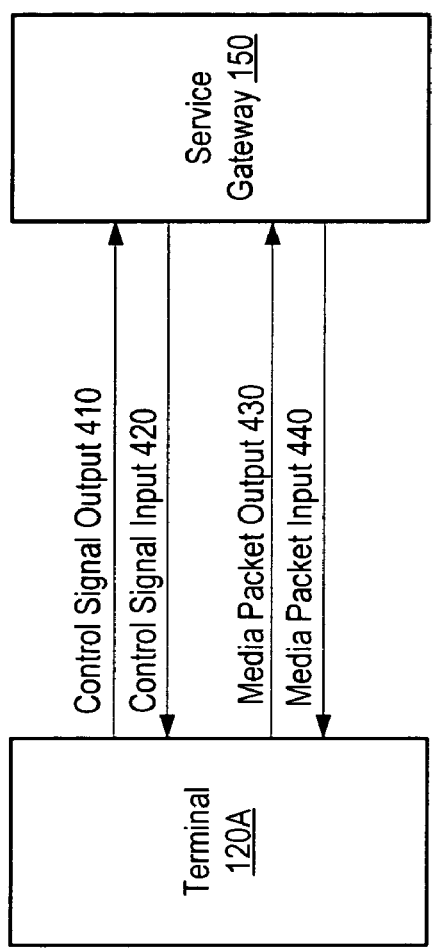
FIG. 4 illustrates one embodiment of the connections between a terminal and a service gateway.

FIG. 4 illustrates one embodiment of the connections between a terminal 120A and a service gateway 150. Terminal 120A may output control signals to service gateway 150 such as a start page request or an end page request. Terminal 120A may receive control signals as inputs from service gateway 150. For instance, if terminal 120A is the originator of a page activity, it may receive a control signal 420 indicating that a configuration of the page activity is complete, further indicating that terminal 120A may begin transmitting media packets, such as media packet output 430. In addition, after transmitting an end page request, terminal 120A may receive a control signal 420 indicating that the page activity is complete. Alternatively, if terminal 120A is not the originator of a page activity, it may receive a control signal 420 causing it to become active (e.g., go off-hook) in anticipation of receiving media packets, such as media packet, input 440. Such control signals may also configure a receiving terminal to listen to a particular port for the media packets. In addition, terminal 120A may receive a control signal 420 indicating the end of a page activity and causing it to enter an idle state (e.g., go on-hook).

Figure 5:
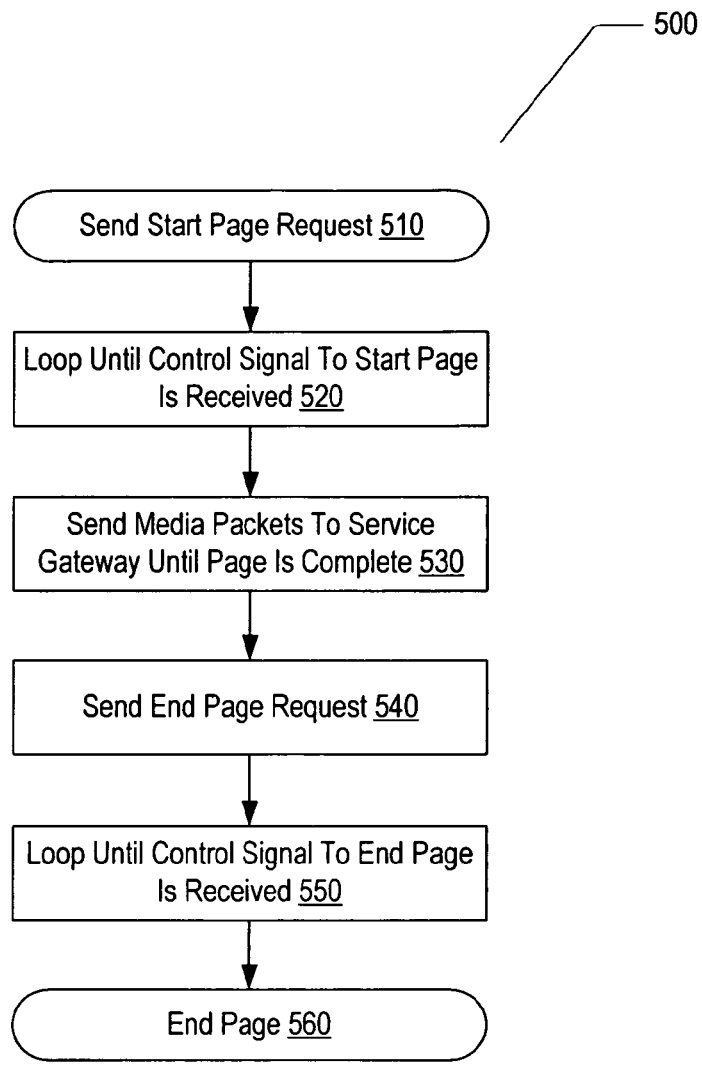
FIG. 5 illustrates one embodiment of a process that may be used by an initiating terminal in a hosted IP-telephony system during a page activity.

FIG. 5 illustrates one embodiment of a process 500 that may be used by an initiating terminal in a hosted IP-telephony system during a page activity. An initiating terminal may begin a page activity by sending a start page request (block 510). The initiating terminal may then wait to receive a control signal indicating that other elements involved in the requested page activity have been configured in an active state (block 520). Alternatively, the initiating terminal may simply await a signal indicating it may proceed with the page. Once this control signal has been received, the initiating terminal may send media packets until the page activity is complete (block 530). To terminate the page activity, an end page request may be sent (block 540) by the initiating terminal. The initiating terminal may then wait to receive a control signal indicating that other elements involved in the page activity have been configured in an idle state (block 550). Once this control signal has been received, the page activity is ended (block 560).

Figure 6:
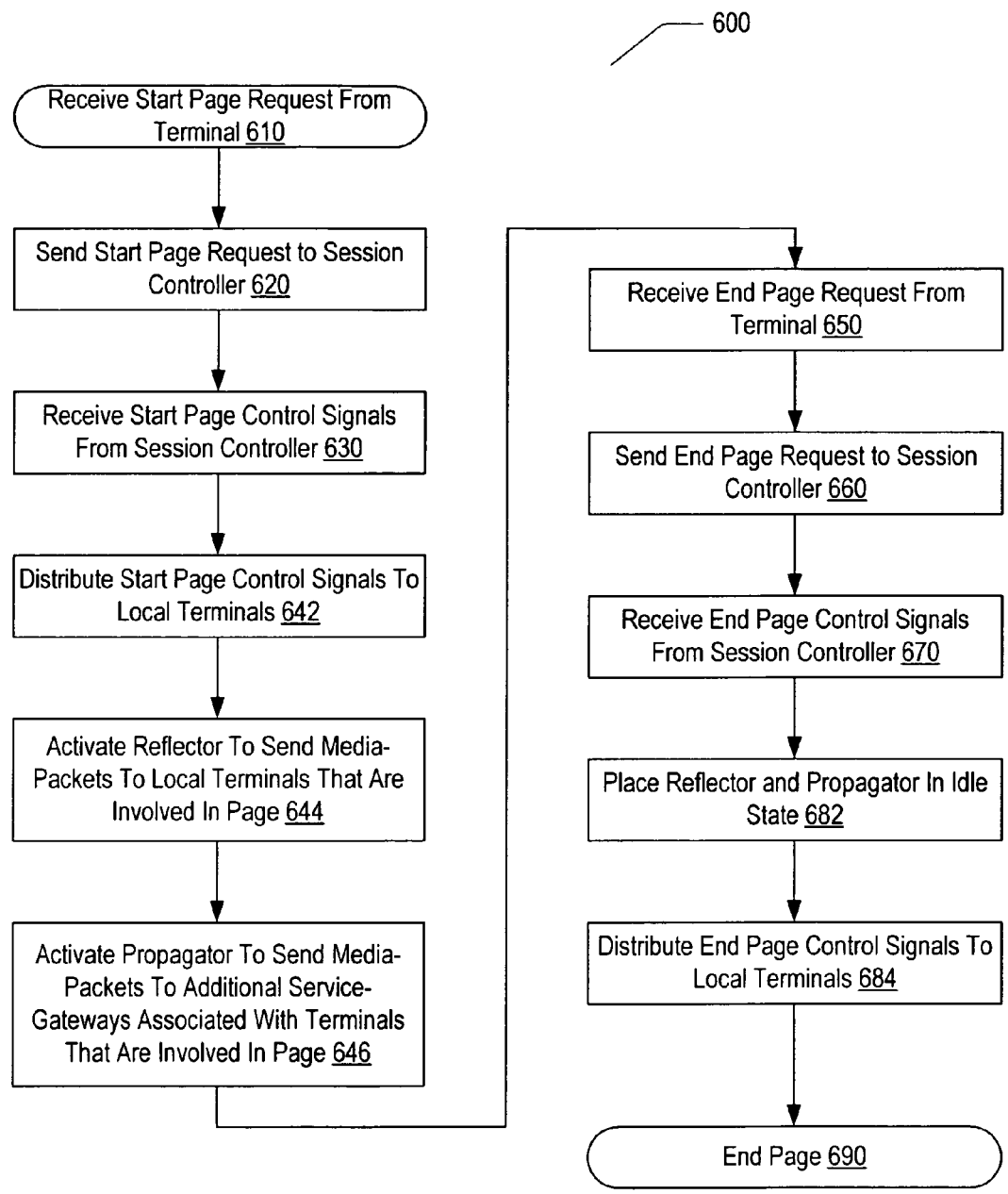
FIG. 6 illustrates one embodiment of a process that may be used by a service gateway in a hosted IP-telephony system to handle control signals.

FIG. 6 illustrates one embodiment of a process 600 that may be used by a service gateway in a hosted IP-telephony system to handle control signals. At the beginning of a page activity, a start page request may be received from an initiating terminal (block 610). In response, the start page request may be forwarded to a session controller (block 620). Next, one or more start page control signals may be conveyed by the session controller (block 630). In response to receiving control signal(s) from the session controller, one or more service gateways may send control signals to local terminals, i.e., those terminals that are coupled to the service gateway that are involved, in the page signal, including the initiating terminal (block 642). Also, a reflector used to send media packets to local terminals may be activated (block 644). In addition, a propagator used to send media packets to additional service gateways associated with remote terminating terminals that are involved in the requested page activity may be activated (block 646). To end the page activity, an end page request may be received from the initiating terminal (block 650). In response, the end page request may be forwarded to a session controller (block 660). Next, one or more end page control signals may be received from the session controller (block 670). In response, the reflector and propagator may be placed in an idle state (block 682). In addition, end page control signals may be sent to local terminals (block 684). Once these control signal have been distributed, the page activity is ended (block 690).

Figure 7:
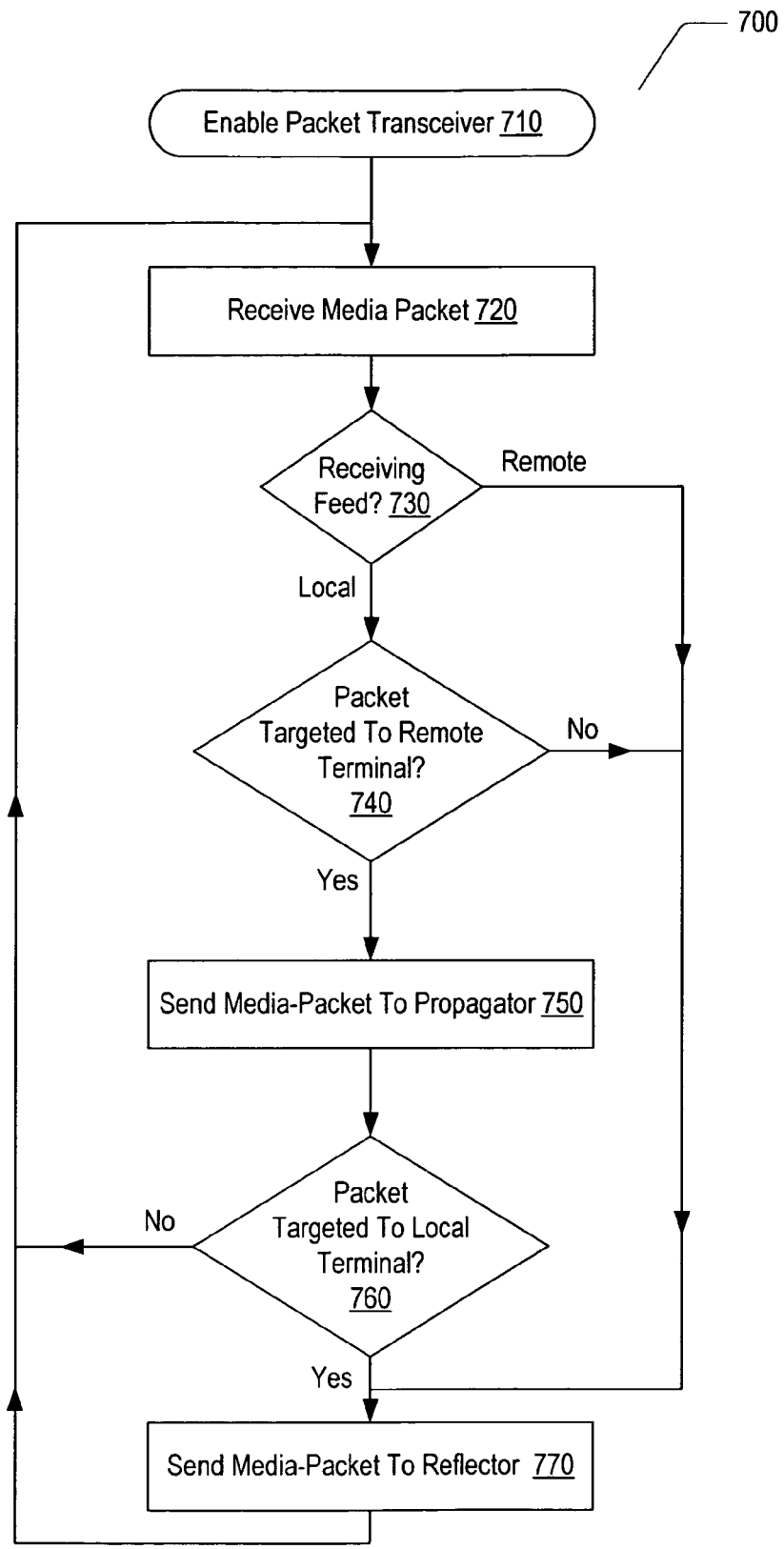
FIG. 7 illustrates one embodiment of a process that may be used by a service gateway in a hosted IP-telephony system to handle media packets.

FIG. 7 illustrates one embodiment of a process 700 that may be used by a service gateway in a hosted IP-telephony system to handle media packets. Process 700 begins with the enabling of a packet transceiver (block 710). Once enabled, the packet transceiver may receive a media packet (block 720). The packet transceiver may detect the type of feed from which the packet was received (decision block 730). If the feed is a local feed, the packet transceiver may determine if the packet is targeted to one or more remote terminating terminals (decision block 740) and if so, send the media packet to a propagator (block 750). Next, the packet transceiver may determine if the packet is targeted to one or more local terminating terminals (decision block 760) and if so, send the media packet to a reflector (block 770). If the feed is a remote feed or a local feed that is not targeted to any remote terminating terminals, the packet transceiver may send the media packet to the reflector (block 770) but not to the propagator. After sending the media packet to the reflector and/or the propagator, the packet transceiver may return to block 720 to await arrival of the next media packet.

In the embodiment described in the preceding discussions of FIG. 6 and FIG. 7, the service gateway uses information from the received control signals indicating the locations of participating terminals to determine whether or not to send media packets to the reflector and/or the propagator. In an alternative embodiment, the service gateway may forward the information from the received control signals indicating the locations of participating terminals to the reflector and propagator, which may then be configured to forward media packets accordingly. In this embodiment, the packet transceiver may forward all media packets to both the reflector and propagator, each of which is configured to forward the media packets only to participating terminals according to the information received in the control signals.

Figure 8:
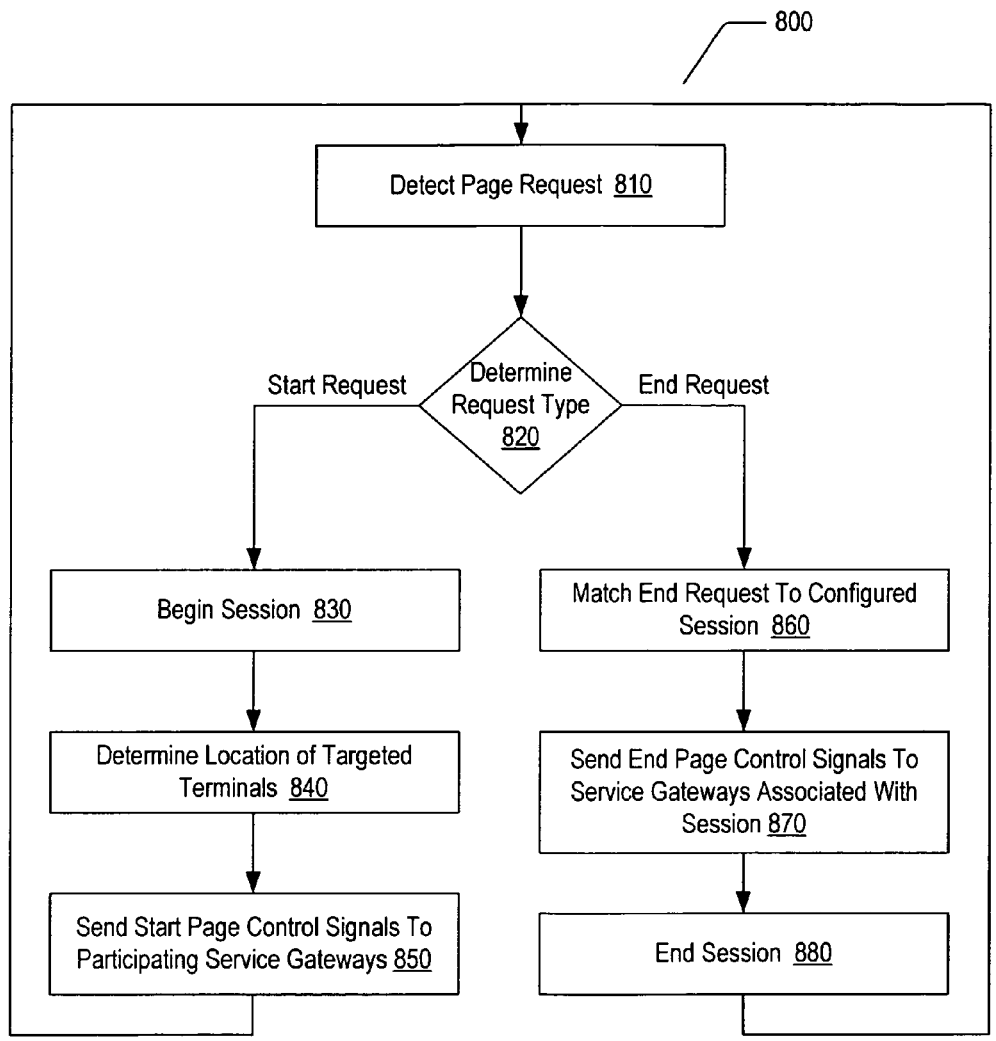
FIG. 8 illustrates one embodiment of a process that may be used by a session controller in a hosted IP-telephony system to handle control signals.

FIG. 8 illustrates one embodiment of a process 800 that may be used by a session controller in a hosted IP-telephony system to handle control signals. Process 800 begins with the detection of a page request (block 810). Once a page request is detected, the type of request may be determined (decision block 820). If the request is a start request, a session may be started (block 830). Next, the locations of terminating terminals may be determined (block 840) and corresponding information inserted into one or more start page control signals, which may be sent to participating service gateways (block 850). After sending the start page control signals, the session controller may return to block 810 to await arrival of the next page request. If the request is an end request, it may be matched to an active session (block 860). Next, one or more end page control signals may be sent to service gateways participating in the matching session (block 870). After sending the end page control signals, the session is ended (block 880) and the session controller may return to block 810 to await arrival of the next page request.

Figure 9:
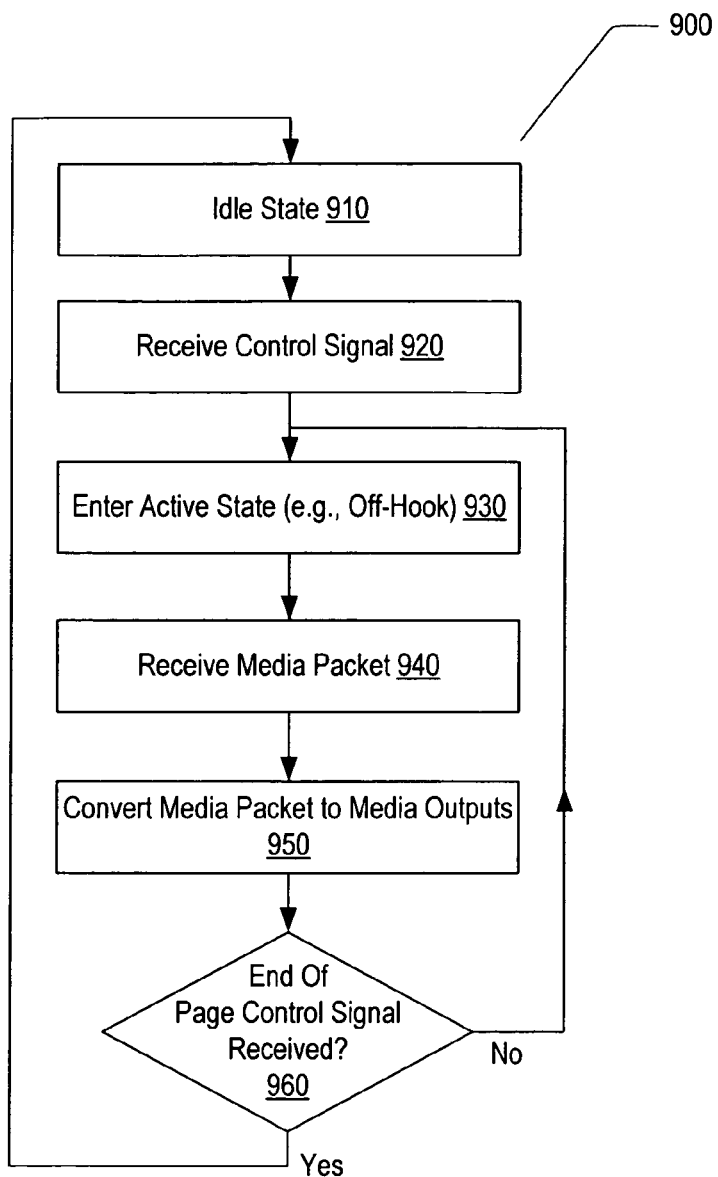
FIG. 9 illustrates one embodiment of a process that may be used by a terminating terminal in a hosted IP-telephony system during a page activity.

FIG. 9 illustrates one embodiment of a process 900 that may be used by a terminating terminal in a hosted IP-telephony system during a page activity. Prior to the start of a page activity, a terminating terminal may be in an idle state (block 910). At the start of a page activity, a control signal may be received (block 920), causing the terminating terminal to enter an active state, e.g. go off-hook (block 930). In the active state, the terminating terminal may receive a media packet (block 940) and convert it to a media output (block 950). If an end of page control signal is not received (decision block 960) the terminating terminal may remain in the active state ready to receive another media packet (block 930). If an end of page control signal is received (decision block 960) the terminating terminal may return to the idle state (block 910).

It is noted that the above described embodiments may comprise software. In such an embodiment, the program instructions which implement the methods and/or mechanisms may be conveyed or stored on a computer readable medium. Numerous types of media which are configured to store program instructions are available and include hard disks, floppy disks, CD-ROM, DVD, flash memory, programmable ROMs (PROM), random access memory (RAM), and various other forms of volatile or non-volatile storage. Thus, various embodiments may further include receiving, sending or storing instructions and/or data implemented in accordance with the foregoing description upon a computer readable medium.

Although the embodiments above have been described in considerable detail, numerous variations and modifications will become apparent to those skilled in the art once the above disclosure is fully appreciated. It is intended that the following claims be interpreted to embrace all such variations and modifications.

What is claimed is:

1. A telephone system comprising:
   a session controller; and
   one or more nodes coupled to the session controller, wherein each node includes a service gateway coupled to one or more terminals;
   wherein each service gateway of the one or more nodes is comprised of at least a reflector, propagator, and control signal distributor, and wherein each service gateway of the one or more nodes includes its own said reflector, own said propagator, and own said control signal distributor;
   wherein a first terminal of a first node is configured to convey a media packet to a first service gateway during a page activity;
   wherein in response to determining one or more terminating terminals are associated with one or more remote nodes, the first service gateway is configured to propagate the media packet to one or more other service gateways associated with the one or more terminating terminals;
   wherein in response to determining one or more terminating terminals are included in the first node, the first service gateway is configured to reflect the media packet back to the one or more terminating terminals included in the first node;
   wherein the first terminal of the first node is configured to convey a start page request to the first service gateway to initiate a page activity between the first terminal and one or more terminating terminals, and wherein the first service gateway is configured to convey the start page request to the session controller; and
   wherein in response to receiving the start page request from the first service gateway, the session controller is configured to convey one or more first control signals to one or more respective service gateways, wherein each of said respective service gateways is different from the first service gateway.

2. The system of claim 1,
   wherein the start page request includes information identifying the one or more terminating terminals;
   wherein each of said first control signals contains information identifying which of the one or more terminals associated with a respective service gateway is a terminating terminal; and
   wherein in response to receiving the first control signals, each of said respective service gateways is configured to convey one or more second control signals to its associated terminating terminals.

3. The system of claim 2, wherein the session controller is configured to store data identifying the service gateway to which each terminal is coupled.

4. The system of claim 2,
   wherein the first terminal is configured to convey a media packet to the first service gateway during a page activity; and
   wherein in response to receiving the at least one of said first control signals, the control signal distributor of the first service gateway is configured to:
      convey control signals to the reflector indicating which terminals coupled to the first service gateway are to receive media packets during a page activity; and
      convey control signals to the propagator indicating which service gateways are to receive media packets targeted to terminals that are not coupled to the first service gateway.

5. The system of claim 4,
   wherein in response to receiving the second control signal, each terminating terminal is configured to enter an active state; and wherein in the active state, each terminating terminal is configured to translate received media packets into telephony signals.

6. The system of claim 2,
wherein the first terminal is configured to convey a media packet to the first service gateway during a page activity;
wherein the first service gateway is configured to forward said media packet to a second service gateway of the one or more respective service gateways; and
wherein information contained in at least one of said first control signals identifies the second service gateway.

7. The system of claim 6,
wherein the second service gateway is configured to forward said media packet to one or more designated terminating terminals; and
wherein information contained in at least one of said first control signals identifies the designated terminating terminals.

8. The system of claim 2, wherein the first terminal is configured to convey an end page request to the first service gateway to terminate a page activity.

9. The system of claim 1, wherein said session controller comprises a remotely located server hosted by a service provider, and wherein said one or more nodes are coupled to share said session controller via the Internet.

10. The system of claim 9, wherein said start page request corresponds to a group including a first terminating terminal associated with the first node, and a second terminating terminal associated with a second node different from the first node.

11. The system of claim 9, wherein said page activity comprises conveying voice data from the first terminal to each of the one or more terminating terminals, wherein when said voice data is received by the terminating terminals, each of the terminating terminals automatically provides said voice data via a built-in speakerphone without a user acknowledging the page request.

12. An IP-telephony service gateway comprising:
a reflector;
a propagator;
a packet transceiver unit; and
a control signal distributor;
wherein in response to the service gateway receiving a media packet from a first terminal of a first node during a page activity and the service gateway determining one or more terminating terminals are associated with one or more remote nodes, the propagator is configured to propagate the media packet to one or more other service gateways associated with the one or more terminating terminals;
wherein in response to the service gateway determining one or more terminating terminals are included in the first node, the reflector is configured to reflect the media packet back to the one or more terminating terminals included in the first node;
wherein the service gateway is further configured to:
receive a first start page request from a first terminal, said first start page request initiating a page activity between the first terminal and one or more terminating terminals, and wherein the first start page request includes information identifying the one or more terminating terminals,
forward the first start page request to a session controller; and
receive from the session controller a first control signal containing information identifying which of the one or more terminals associated with the service gateway is a terminating terminal, wherein the first control signal is conveyed by the session controller in response to a second start page request from a different service gateway.

13. The service gateway of claim 12, wherein the control signal distributor is configured to:
convey control signals to the reflector indicating which terminals coupled to the first service gateway are to receive media packets during a page activity;
convey control signals to the propagator indicating which service gateways are to receive media packets targeted to terminals that are not coupled to the first service gateway; and
convey a second control signal to each of the terminating terminals in response to receiving the first control signal.

14. A method of paging in an IP-telephony system, the method comprising:
conveying a media packet from a first terminal of a first node to a first service gateway during a page activity;
wherein in response to determining one or more terminating terminals are associated with one or more remote nodes, propagating the media packet from the first service gateway to one or more other service gateways associated with the one or more terminating terminals;
wherein in response to determining one or more terminating terminals are included in the first node, reflecting the media packet from the first service gateway back to the one or more terminating terminals included in the first node;
receiving a start page request at the first service gateway initiating a page activity between a first terminal and one or more terminating terminals;
forwarding the start page request from the service gateway to a session controller; and
in response to receiving the start page request, the session controller conveying one or more first control signals to one or more respective service gateways, wherein each of said respective service gateways is different from the first service gateway.

15. The method of claim 14,
wherein the start page request includes information identifying the one or more terminating terminals;
wherein each of said first control signals contains information identifying which of the one or more terminating terminals is associated with a respective service gateway, the method further comprising
each service gateway conveying one or more second control signals to each of its associated terminating terminals in response to the first control signal.

16. The method of claim 15, further comprising:
the first terminal conveying a media packet to the first service gateway of the one or more service gateways during a page activity; and
the first service gateway forwarding said media packet to one or more designated terminating terminals, wherein information contained in at least one of said first control signals identifies the designated terminating terminals.

17. The method of claim 16, further comprising each terminating terminal entering an active state in response to receiving the second control signal, wherein in the active state, each terminating terminal is configured to translate received media packets into telephony signals.

18. The method of claim 15, further comprising:
the first terminal conveying a media packet to the first service gateway of the one or more service gateways during a page activity; and the first service gateway forwarding said media packet to a second service gateway of one of the one or more service gateways, wherein information contained in at least one of said first control signals identifies the second service gateway.

19. The method of claim 18, further comprising the second service gateway forwarding said media packet to one or more designated terminating terminals, wherein information contained in at least one of said first control signals identifies the designated terminating terminals.

20. The method of claim 15, further comprising the first terminal conveying an end page request to terminate a page activity.

21. A method of coordinating paging in an IP-telephony service gateway, the method comprising:
   wherein a first terminal of a first node is configured to convey a media packet to the service gateway during a page activity;
   wherein in response to the service gateway receiving a media packet and the service gateway determining one or more terminating terminals are associated with one or more remote nodes, the propagator is configured to propagate the media packet to one or more other service gateways associated with the one or more terminating terminals;
   wherein in response to the service gateway determining one or more terminating terminals are included in the first node, the reflector is configured to reflect the media packet back to the one or more terminating terminals included in the first node;
   receiving a first start page request from a first terminal, said first start page request initiating a page activity between the first terminal and one or more terminating terminals;
   forwarding the first start page request to a session controller; and
   receiving from the session controller a first control signal containing information identifying which of the one or more terminals associated with the service gateway is a terminating terminal, wherein the first control signal is conveyed by the session controller in response to a second start page request from a different service gateway.

22. The method of claim 21, further comprising:
   conveying a second control signal to each of the terminating terminals in response to receiving the first control signal;
   conveying control signals to a reflector indicating which terminals coupled to the service gateway are to receive media packets during a page activity; and
   conveying control signals to a propagator indicating which service gateways are to receive media packets targeted to terminals that are not coupled to the service gateway;
   receiving a media packet from the first terminal during a page activity;
   forwarding said media packet to one or more designated terminating terminals, wherein information contained in the first control signal identifies the designated terminating terminals; and
   forwarding said media packet to one or more additional service gateways, wherein information contained in the first control signal identifies the one or more additional service gateways.

23. The method of claim 22, wherein the start page request includes information identifying the one or more terminating terminals.

24. A non-transitory computer readable storage medium containing instructions that, when executed by a processor in an IP-telephony service gateway, enable the gateway to:
   wherein in response to receiving a media packet from a first terminal of a first node during a page activity and determining one or more terminating terminals are associated with one or more remote nodes, propagate the media packet to one or more other service gateways associated with the one or more terminating terminals;
   wherein in response to determining one or more terminating terminals are included in the first node, reflect the media packet back to the one or more terminating terminals included in the first node;
   receive a first start page request from a first terminal, said first start page request initiating a page activity between the first terminal and one or more terminating terminals;
   forward the first start page request to a session controller; and
   receive from the session controller a first control signal containing information identifying which of the one or more terminals associated with the service gateway is a terminating terminal, wherein the first control signal is conveyed by the session controller in response to a second start page request from a different service gateway.

25. The medium of claim 24, further comprising instructions that when executed enable the gateway to:
   convey a second control signal to each of the terminating terminals in response to receiving the first control signal;
   convey control signals to a reflector indicating which terminals coupled to the gateway are to receive media packets during a page activity;
   convey control signals to a propagator indicating which other service gateways are to receive media packets targeted to terminals that are not coupled to the gateway;
   receive a media packet from the first terminal during a page activity;
   forward said media packet to one or more designated terminating terminals, wherein information contained in the first control signal identifies the designated terminating terminals; and
   forward said media packet to one or more additional service gateways, wherein information contained in the first control signal identifies the one or more additional service gateways.

\* \* \* \* \*